United States Patent [19]
Phillips et al.

[11] Patent Number: 5,218,866
[45] Date of Patent: Jun. 15, 1993

[54] METHOD AND DEVICE FOR MEASURING FLUID VELOCITIES

[75] Inventors: Melvin R. Phillips, Mims; Eugene Kaine, Oviedo, both of Fla.

[73] Assignee: The United States of America as represented by the Secretary of the Army, Washington, D.C.

[21] Appl. No.: 657,587

[22] Filed: Feb. 19, 1991

[51] Int. Cl.⁵ ............................................. G01F 1/68
[52] U.S. Cl. ........................... 73/204.15; 73/204.14; 73/170.12
[58] Field of Search ........... 73/204.14, 204.15, 204.16, 73/189, 204.26

[56] References Cited

U.S. PATENT DOCUMENTS

| | | | |
|---|---|---|---|
| 3,603,147 | 9/1971 | Dorman | 73/204.15 |
| 3,683,692 | 8/1972 | Lafitte | 73/204.14 |
| 3,995,480 | 12/1976 | Edgerton | 73/188 |
| 4,024,761 | 5/1977 | Djorup | 73/204.15 |
| 4,450,719 | 5/1984 | Nishimura et al. | 73/204.15 |
| 4,562,731 | 1/1986 | Nishimura et al. | 73/204.15 |
| 4,587,842 | 5/1986 | Handtmann | 73/204.14 |
| 4,651,564 | 3/1987 | Johnson et al. | 73/204.26 |
| 4,733,559 | 3/1988 | Aine et al. | 73/195 |
| 4,756,670 | 7/1988 | Arai | 73/204.15 |
| 4,872,339 | 10/1989 | Gerhard et al. | 73/204.14 |
| 4,884,215 | 11/1989 | Zboralski et al. | 73/204.14 |
| 5,069,066 | 12/1991 | Djorup | 73/204.15 |

*Primary Examiner*—Michael Razavi
*Assistant Examiner*—Raymond Y. Mah
*Attorney, Agent, or Firm*—Anthony T. Lane; Edward Goldberg; Edward F. Costigan

[57] ABSTRACT

The velocity of a fluid in a positive or negative direction is measured by use of a thermistor in a feedback circuit. The temperature of a flow thermistor is balanced with the temperature of a reference thermistor by sensing temperature through resistance by way of its voltage and adding power until the flow thermistor is at the same temperature as the reference thermistor. The ratio of reference power used as compared to flow power is indicative of the fluid's speed. Power is added by sending a signal of varying frequency to the flow thermistor; the reference thermistor is powered by a constant frequency signal. Power is measured by comparing the frequencies of the reference signal to the flow signal. Fluid direction is measured by placing a direction thermistor on either side of the flow thermistor, measuring the temperature of each direction thermistor, the cooler thermistor being upstream of the flow thermistor.

2 Claims, 3 Drawing Sheets

METHOD AND DEVICE FOR MEASURING FLUID VELOCITIES

GOVERNMENT INTEREST

The invention described herein may be manufactured, used and licensed by or for the Government for Government purposes without the payment to us of any royalties thereon.

FIELD OF THE INVENTION

This invention relates in general to devices for measuring the velocity of fluids and in particular to an electronic means for measuring wind speed for aid in the aiming of ballistic weapons.

BACKGROUND OF THE INVENTION

The accuracy of such weapons is very dependent on the velocity of the cross wind prevailing during its flight. This is especially the case as the travelled distance increases. Prior art wind velocity sensors are either excessively large, complicated and heavy, or too slow and inaccurate, or expensive for this intended application.

SUMMARY AND OBJECTS OF THE INVENTION

It is an object of the present invention to provide a small, compact, accurate, light-weight, fast and inexpensive wind velocity sensor useful for many applications. Especially for applications such as the fire control system of hand carried portable ballistic weapons.

This invention uses, in addition to other components, two thermistors. These thermistors have the property like many other electrical resistors that they generate heat in proportion to the amount of electrical power they receive. Some of this heat is dissipated into the surroundings and the rest causes the temperature of the thermistor to rise. The amount of temperature rise is inversely proportional to the amount of heat dissipated, and the amount of heat dissipated is proportional to the ambient temperature and the fluid velocity over the surface of the thermistor. One of these thermistors is placed in the flow of fluids to be measured, and the other is placed out of the flow but subject to the ambient temperature to be used as a reference.

Another property of thermistors is that their resistance changes with temperature. Therefore, what has been termed a flow thermistor, while in a flow, will have a lower temperature and a different resistance than the reference thermistor.

According to the invention a feedback circuit is employed which uses this difference in resistance to adjust the power in the flow thermistor such that the temperature of both thermistors is equal. The feedback circuit works by using the difference in resistance to form different voltages, and then this difference controls the frequency of a wave fed to the flow thermistor. The power received by the flow thermistor being proportional to the frequency of the wave. The reference thermistor is fed by a constant frequency wave. Therefore, since the flow of fluid across the flow thermistor, is proportional to its temperature compared to the reference thermistor, and the feedback circuit maintains the temperature of the flow thermistor equal to the reference thermistor by means of frequency, then the frequency of the flow thermistor compared to the reference thermistor is proportional to the flow. The ratio of the fixed frequency and the flow thermistor frequency can easily be measured and converted into the speed of the flowing fluid. This method avoids the complicated relationships of power, temperature and thermistor resistance associated with either a constant current or constant voltage drive that would result in non-linearity and instability of the feedback loop.

In order to determine the wind direction smaller matched thermistors are placed on the sides of the flow thermistor. Depending of the direction of the fluid one of these smaller thermistors will be downstream and receiving the heat given off by the flow thermistor. This will cause the downstream thermistor to have a higher temperature and therefore a different resistance. Determining if a difference in resistance exists and which thermistor has the greater or lesser resistance is quite easy. This difference is then used to determine the direction of the flow.

It is an object of this invention to provide fast, low cost accurate measurements of fluid velocities wherever needed. Examples are fire control systems, weather stations, low speed wind tunnels, air conditioning ducts, air velocities and sailboat wind speed indicators. This invention provides a simple and unique method of applying power to thermistors that is lacking in the complicated relationships of other methods. This inventive method makes it very easy to measure the power received by the thermistors and in this application to measure the fluid velocity.

A further object of this invention is to create a method and device for measuring fluid velocities that is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
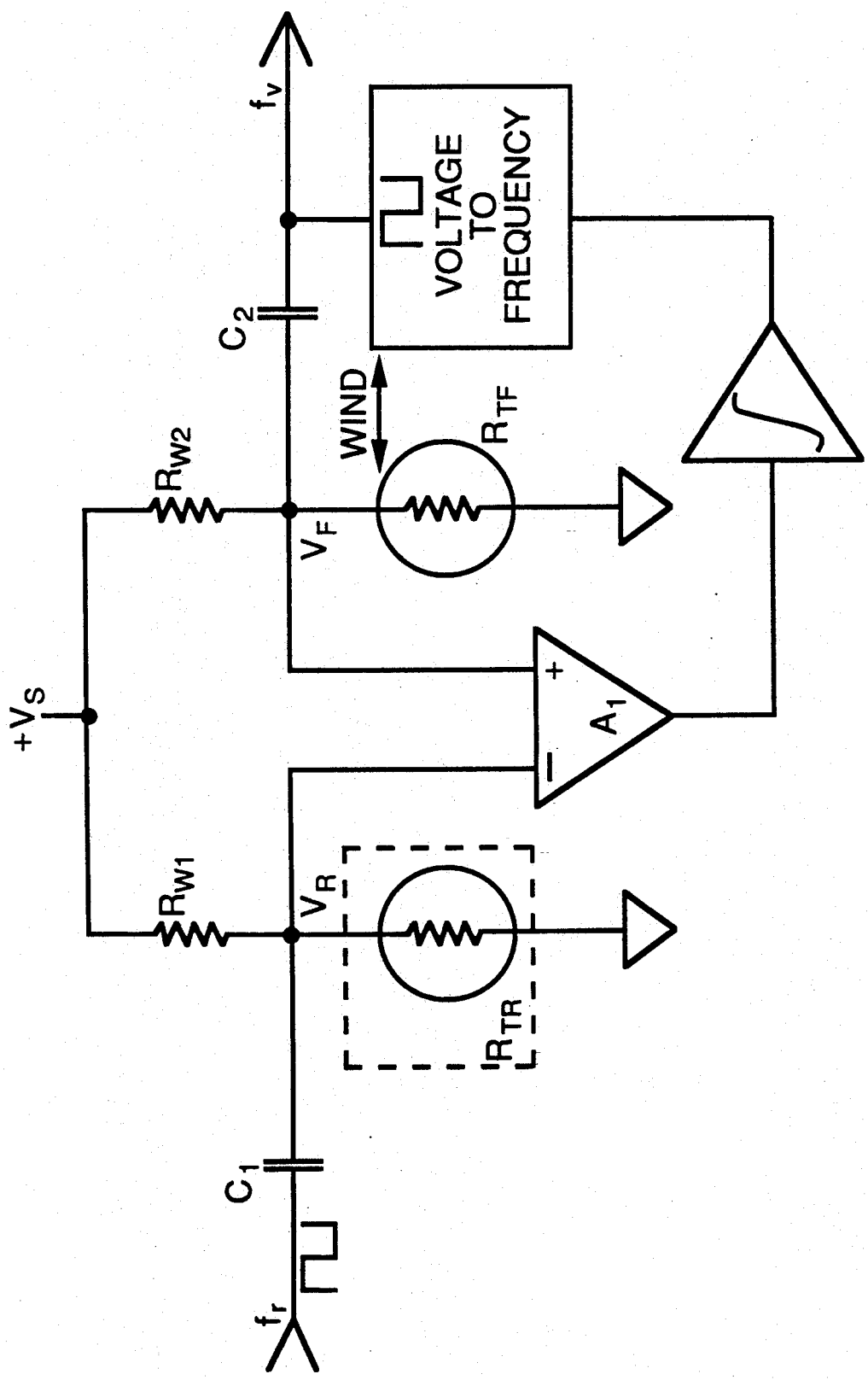
FIG. 1 is a schematic diagram showing the wind speed circuit.

Referring to the drawings in particular, the invention embodied therein comprises two self heated thermistors $R_{TR}$ and $R_{TF}$ positioned inside a length of one-half inch diameter plastic tube (not shown). These two thermistors are used to sense wind speed and are designated as the reference thermistor RTR and the flow thermistor RTF. Each thermistor is heated above ambient temperature by an application of power. In the steady-state, the power and temperature rise are related by the equation:

$$P = \delta \Delta T \tag{1}$$

where $\delta$ is the dissipation constant of the thermistor, P is the thermal energy supplied and $\Delta T$ is the change in temperature due to the power, P applied. The dissipation constant $\delta$ is a function of wind velocity flowing across the thermistor surface. The reference thermistor in this sense is subjected to the ambient air temperature but is shielded from air movement. Thus, equation (1) becomes:

$$P_R = \delta_o \Delta T_R \qquad (2)$$

where $\delta_o$ is the dissipation constant for still air.

The flow thermistor is subjected to the air flow, again at ambient temperature. Thus, equation (1) for the flow thermistor becomes:

$$P_F = \delta_F \Delta T_F \qquad (3)$$

where the air flow is constant and $\delta_F$ is the dissipation constant for that flow rate. Thus, if the ratio of equations (2) and (3) is taken:

$$(P_R/P_F) = (\delta_F \Delta T_F)/(\delta_o \Delta T_R) \qquad (4)$$

and if $\Delta T_F$ is maintained equal to $\Delta T_R$ because of a feedback circuit, a direct measure of wind velocity is given by:

$$\delta_F = \delta_o (P_E/P_R) \qquad (5)$$

because $\delta_o$ is given and $P_F$ and $P_F$ are measured. By inspection, at zero flow, $\delta_F = \delta_o$ and therefore $P_F = P_o$. Thus, the plot of $\delta_F$ versus wind velocity starts at $\delta_F = \delta_o$ at zero velocity. By realizing $\delta_F = \delta_o \delta_w$, equation (5) can be rewritten as $$\delta_w = \delta_o ([P_F/P_R)] - 1) \qquad (6)$$

such that the curve plots from zero at zero wind velocity.

The assumption of $\Delta T_F = \Delta T_R$ can be implemented by accomplishing two tasks. First, the resistance vs. temperature characteristics of the reference and flow thermistors should be closely matched. Secondly, a feedback loop may be devised to vary $P_F$ as a function $\Delta T_F$ and $\Delta T_R$ and drive the differential temperature to zero.

FIG. 1 shows the block diagram for the disclosed wind sensor. The thermistors $R_{TR}$ being the reference thermistor and $R_{TF}$ being the flow thermistor are placed in a first bridge circuit by adding resistors $R_{W1} = R_{W2} >> R_T$. At equilibrium and no flow, the dc components of $V_R$ and $V_F$ are equal because $R_{TR}$ and $R_{TF}$ are equal and the output of $A_1$ is zero. Power is applied to each thermistor via capacitors $C_1$, and $C_2$ which are of equal value. If a square wave is applied to the capacitor input ($f_r$ and $f_v$, FIG. 1), it is easily shown that the power applied to $R_{TR}$ and $R_{TF}$ is a linear function of frequency (P=kf) if $\frac{1}{2}f >> 5R_TC$. This condition insures that all the energy added to the capacitor at each transition of the square wave is dissipated in the thermistor. This drive mode avoids the complicated relationships of power, temperature, and thermistor resistance associated with either constant current or constant voltage drives that would result in non-linearity and instability of the feedback loop.

The reference frequency, $f_r$, is maintained at a constant value which maintains a constant power, $P_R$, in $R_{TR}$, regardless of ambient temperature. Thus, from equation (2) $\Delta T_R$ is also a constant value above ambient temperature.

Amplifier A, produces a voltage proportional to $V_F - V_R$. This voltage is integrated and applied to a voltage-to-frequency converter whose output square wave is applied through $C_2$ to $R_{TF}$ (see FIG. 1). The polarities are arranged to force $V_F = V_R$ and thus, at equilibrium, $R_{TR} = R_{TF}$. Under no flow conditions, $f_r = f_v$ and thus $P_R = P_F$. When the wind flows across $R_{TF}$, $\delta_w$ increases and thus $P_F$ (and $f_v$) is raised to maintain $\Delta T_F = \Delta T_R$, implying $R_{TR} = R_{TF}$. Thus $f_v$ is a direct function of wind velocity, which is also shown by rearranging equation (6) and substituting $P = kf$ to give:

$$f_v/f_r = (\delta_o + \delta_w)/\delta_o \qquad (7)$$

Figure 3:
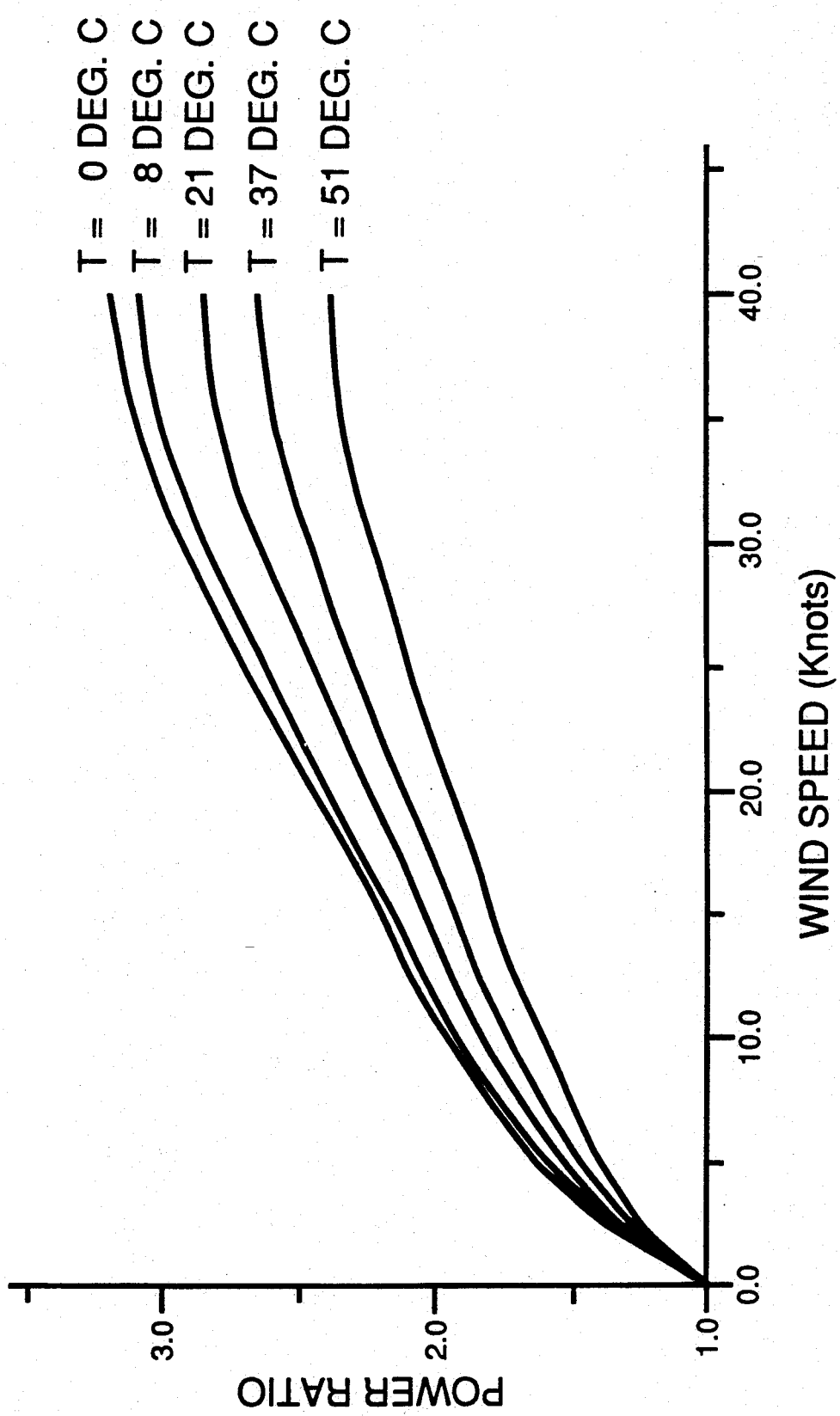
FIG. 3 is a graph showing a plot of the power ratio to wind speed for different ambient temperatures.

FIG. 3 shows data taken using a working prototype implementation of FIG. 1. The frequency ratio fv/fr is plotted versus wind velocity. The curves show a linear function shift with changes in ambient temperature. This variation is easily compensated giving accurate and repeatable results.

Figure 2:
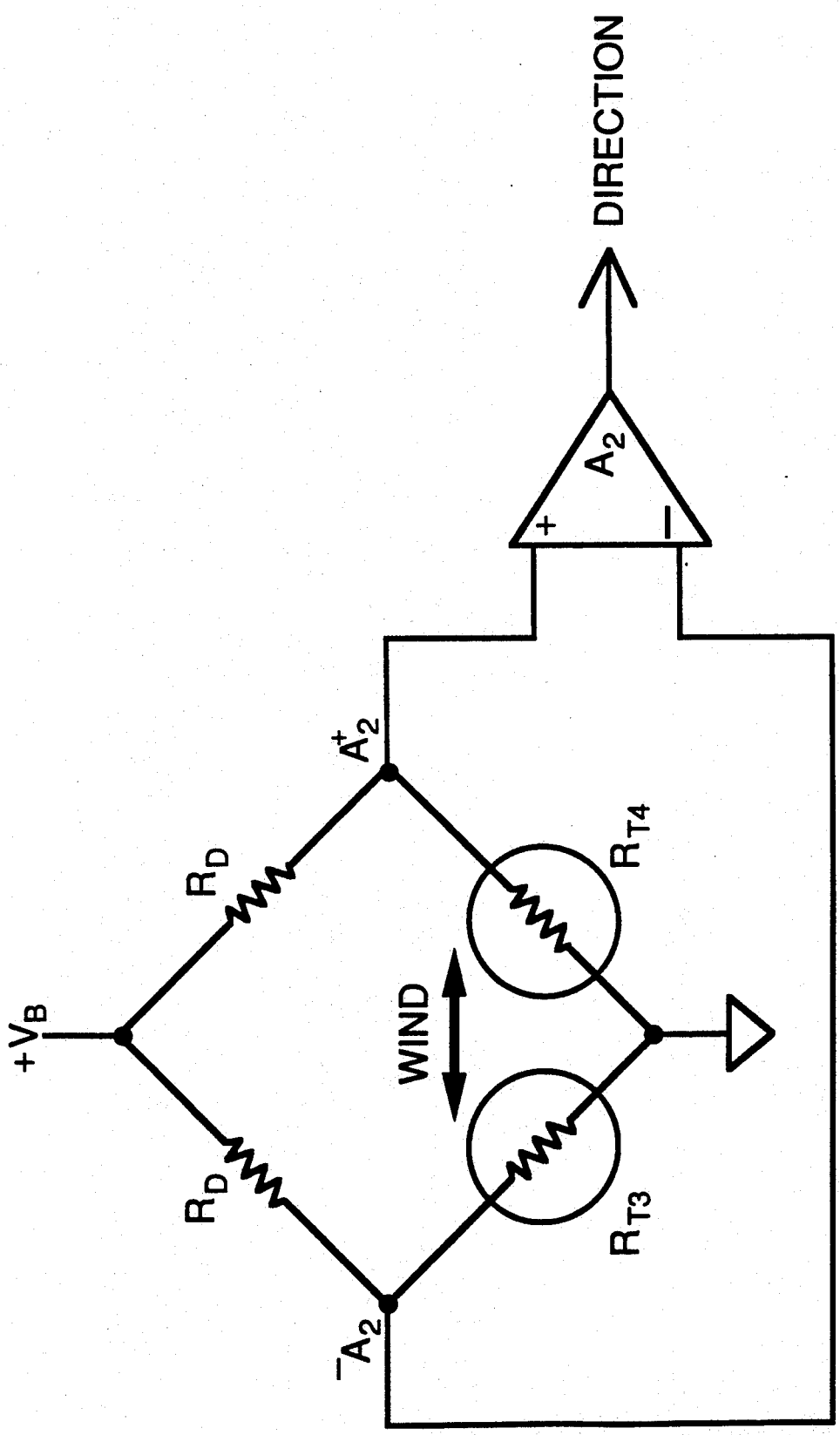
FIG. 2 is a schematic diagram showing the wind direction circuit.

Wind direction is determined by placing two smaller matched thermistors ($R_{T3}$ and $R_{T4}$, FIG. 2) on either side of $R_{TF}$ spaced equal distances away. These thermistors are heated by $R_{TF}$ due to radiation and conduction through the air. A second bridge is constructed using $R_{T3}$, $R_{T4}$ and two fixed resistors, $R_D$, of equal value. At equilibrium with no flow, this bridge is balanced and the output of $A_2$ is zero. The bridge midpoints $A_2^+$ and $A_2^-$ are unbalanced when air flows because the small thermistor up stream of $R_{TF}$ cools more than the downstream thermistor. $A_2$ produces either a positive or negative voltage depending on whether the flow is in one direction of the tube (not shown) or the other, thus indicating direction according to voltage polarity.

While a specific embodiment of the invention has been shown and described in detail to illustrate the application of the principles of the invention, it will be understood that the invention may be embodied otherwise without departing from such principles.

What is claimed is:

1. A fluid speed sensor comprising:
    a first bridge circuit including first and second initial resistors, a reference thermistor, and a flow thermistor, said flow thermistor placed in the fluid to be measured and said reference thermistor being exposed to the fluid's ambient temperature; and wherein said reference thermistor is powered by a reference frequency wave passed through a reference capacitor;
    a feedback circuit means for sensing voltage of said reference thermistor and voltage of said flow thermistor, said feedback circuit applying power to said flow thermistor in order to equalize reference and flow thermistor voltages, and to detect fluid speed based on the fluid speed being proportional to a ratio of flow thermistor power to reference thermistor power, said feedback circuit means applying power to said flow thermistor by means of a variable flow frequency wave pased through a flow capacitor; and the ratio of said reference wave's frequency to said flow wave's frequency being further representative of the fluid speed.

2. A fluid speed sensor in accordance with claim 1, wherein said feedback circuit comprises:
    a first amplifier for generating a signal proportional to a voltage difference between said reference and flow thermistors;
    an integrator receiving the signal generated by said amplifier and delivering a signal representative of the received signal integrated over time; and
    a voltage-to-frequency means for delivering said variable flow frequency wave, with said variable flow frequency wave's frequency varied according to said signal generated by said integrator.

* * * * *